United States Patent
Hariharan

(10) Patent No.: US 10,506,643 B2
(45) Date of Patent: Dec. 10, 2019

(54) BLUETOOTH CONNECTION ESTABLISHMENT

(71) Applicant: Apple Inc., Cupertino, CA (US)

(72) Inventor: Sriram Hariharan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/495,430

(22) Filed: Apr. 24, 2017

(65) Prior Publication Data

US 2018/0084485 A1    Mar. 22, 2018

Related U.S. Application Data

(63) Continuation-in-part of application No. 15/270,482, filed on Sep. 20, 2016, now abandoned.

(51) Int. Cl.
| | |
|---|---|
| *H04L 12/28* | (2006.01) |
| *H04W 76/10* | (2018.01) |
| *H04W 8/00* | (2009.01) |
| *H04W 48/12* | (2009.01) |
| *H04W 56/00* | (2009.01) |
| *H04W 4/80* | (2018.01) |
| *H04W 84/14* | (2009.01) |

(52) U.S. Cl.
CPC .......... *H04W 76/10* (2018.02); *H04W 8/005* (2013.01); *H04W 48/12* (2013.01); *H04W 4/80* (2018.02); *H04W 56/002* (2013.01); *H04W 84/14* (2013.01)

(58) Field of Classification Search
CPC ..................................................... H04W 48/08
See application file for complete search history.

(56) References Cited

U.S. PATENT DOCUMENTS

| | | | |
|---|---|---|---|
| 8,649,734 B1 * | 2/2014 | Lin ...................... | H04B 7/2612 455/41.2 |
| 9,059,223 B2 * | 6/2015 | Weiner .............. | H01L 21/67028 |
| 9,554,344 B2 * | 1/2017 | Huang .................. | H04W 48/12 |
| 2004/0254980 A1 * | 12/2004 | Motegi ................. | H04W 68/00 709/203 |
| 2005/0128988 A1 * | 6/2005 | Simpson ............... | H04W 48/16 370/338 |
| 2005/0282494 A1 | 12/2005 | Kossi et al. | |
| 2006/0062235 A1 * | 3/2006 | Ginzburg .............. | H04W 76/14 370/431 |
| 2009/0215392 A1 | 8/2009 | Rowse et al. | |
| 2011/0274021 A1 | 11/2011 | He et al. | |

(Continued)

*Primary Examiner* — Gerald A Smarth
(74) *Attorney, Agent, or Firm* — Sterne, Kessler, Goldstein & Fox P.L.L.C.

(57) ABSTRACT

Embodiments of the current disclosure facilitate the creation of a wireless connection between a host device and an accessory device over a wireless medium. For instance, according to some embodiments, a method of connecting an accessory device to a host device includes transmitting a plurality of advertising beacons over a wireless medium. Each wireless beacon can contain information identifying a predetermined time when the accessory device will begin a page scan. The accessory device can begin the page scan at the predetermined time and can receive pages from a host device during a page scan window of the page scan over the wireless medium. The received pages can then be subsequently used to establish an ad hoc network connection between the accessory device and the host device.

20 Claims, 10 Drawing Sheets

(56) References Cited

U.S. PATENT DOCUMENTS

| | | |
|---|---|---|
| 2013/0117365 A1 | 5/2013 | Padmanabhan et al. |
| 2014/0057564 A1* | 2/2014 | Palin .................. H04W 8/005 455/41.2 |
| 2015/0109981 A1 | 4/2015 | Patil et al. |
| 2017/0359412 A1 | 12/2017 | Haebler et al. |
| 2018/0084484 A1 | 3/2018 | Hariharan |

* cited by examiner

BLUETOOTH CONNECTION ESTABLISHMENT

CROSS-REFERENCE TO RELATED APPLICATION

This application is a continuation-in-part of U.S. patent application Ser. No. 15/270,482, titled "Bluetooth Connection Establishment," filed on Sep. 20, 2016, which is incorporated by reference herein in its entirety.

BACKGROUND

Ad hoc wireless networks including a host and one or more accessory devices have become common in recent years. An example ad hoc network includes a wireless device, such as a smart phone, and an accessory, such as wireless headphones, connected to the smart phone through which telephone calls and/or music can be streamed. Wireless ad hoc networks (e.g., Bluetooth networks) provide convenient and reliable connections between various devices. However, these networks can also be the cause of frustration due to, for instance, delays with establishing the ad hoc network. Delays can negatively impact a user's experience with usage of the devices over the network.

SUMMARY

Embodiments of the current disclosure facilitate the creation of a connection between a host device and an accessory device over a wireless medium. For instance, according to some embodiments, a method of connecting one or more accessory devices to a host device is provided. The method can include wirelessly transmitting a plurality of advertising beacons. In some embodiments, an advertising beacon may contain information identifying a predetermined time when the accessory device will begin a page scan. The accessory device may begin the page scan at the predetermined time, and may then receive pages from a host device over the wireless medium during the page scan. One or more of the received pages may then be used to establish an ad hoc network connection between the accessory device and the host device.

In some embodiments, an advertising beacon may include information identifying any/all of a duration of a page scan window, a value of a clock for the accessory device at the beginning of the page scan window, information identifying a channel to be used during the page scan window, and/or a temporal offset from a time the advertised beacon is transmitted to the beginning of the page scan window. In some embodiments, the advertising beacons may be implemented as Bluetooth low energy beacons or beacons that comply with other radio protocols. Further, the advertising beacons can be transmitted at any point in time, including at regular or dynamically determined intervals. Furthermore, one or more of the advertising beacons may contain dynamically updated information. In some embodiments, the transmission of the advertising beacons and the beginning of the page scan window may involve a set of operations that cannot be interrupted and that must be completed before another operation can begin.

Some embodiments may include devices and methods for establishing a connection over a wireless medium between those devices, e.g., between an accessory device and a host device. The methods may include receiving an advertising beacon containing information that identifies a time when the accessory device will begin a page scan window. The host device may then page during the page scan window, e.g., at/after the beginning of the page scan window as indicated by the advertising beacon. The host device may then connect with the accessory device over the wireless medium. According to some embodiments, the host device may also determine whether the accessory device is proximate to the host device, e.g., based on one or more received advertising beacons.

In some embodiments, a second beacon that also contains information identifying the time at which the accessory device will begin the page scan can also be transmitted/received. As a result of differing transmission times, the information in the second beacon may differ from the information contained in the first beacon, but the information can still identify the same time at which the accessory device will begin the page scan.

Other embodiments include devices and methods of initiating a connection between a host device and an accessory device. According to some embodiments, the host device may determine that an accessory device is proximate to the host device. The host device can then transmit a connection request to the accessory device. The connection request can include, among other things, information identifying a value of a host device clock. The host device can then receive an acknowledgement from the accessory device. A connection between the accessory device and the host device can then be made, e.g., in order to create an ad hoc wireless network.

In some embodiments, the host device may determine that the accessory device is proximate to the host device by detecting one or more wireless beacons transmitted by the accessory device. The one or more wireless beacons may be implemented as Bluetooth low energy beacons or beacons that comply with other radio protocols, according to some embodiments.

In some embodiments, devices for and methods of initiating a wireless connection between an accessory device and a host device are provided. According to some embodiments, one or more advertising beacons may be transmitted by the accessory device. The accessory device may then receive a connection request from the host device. The connection request may include information identifying the value of a host device clock. The local clock of the accessory device may be synchronized with the clock of the host device, and a connection with the host device may be initiated using the synchronized local clock.

BRIEF DESCRIPTION OF THE DRAWINGS/FIGURES

Embodiments of the present disclosure will now be described, by way of example only, with reference to the accompanying drawings in which corresponding reference symbols indicate corresponding parts. Further, the accompanying drawings, which are incorporated herein, form part of the specification and illustrate embodiments of the present disclosure.

FIG. 1. is a functional block diagram depicting an example of an accessory device in an environment with a plurality of host devices according to some embodiments.

Figure 1:
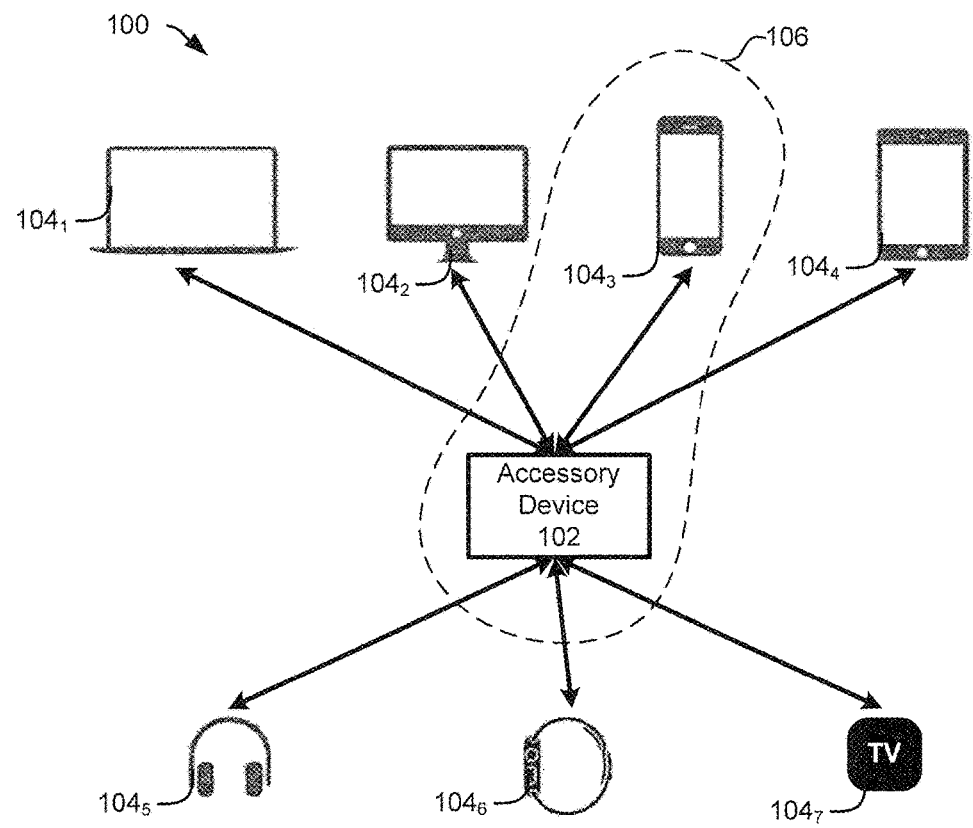

The features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION

FIG. 1 is a functional block diagram depicting an example of an accessory device 102 in an environment 100 with a plurality of host devices $104_1$-$104_7$ (also generically referred to herein as "host device 104") according to some embodiments. FIG. 1 shows the accessory device 102 connected to the host device $104_3$ via a wireless network connection such as, for example, an ad hoc wireless connection 106. The host device $104_3$ may be a device from a wide assortment of different devices. For instance, the host device $104_3$ may include any/all of laptop computers, desktop computers, smart phones, tablet computers, wearable devices (such as an Apple Watch™), human interface devices, speaker devices, headphone devices, multimedia devices (such as an Apple TV™), etc. Based on the disclosure herein, a person of ordinary skill in art will understand that each of the host devices $104_{1-7}$ can form an ad hoc wireless connection with the accessory device 102—similar to the ad hoc wireless connection 106 formed between the host device $104_3$ and the accessory device 102. Further, similar to the host device $104_3$, the host devices $104_{1-2}$ and $104_{4-7}$ can be a device from a wide assortment of different devices such as the devices listed above.

The accessory device 102 may be any computing device, including any of a wireless headset, keyboard, mouse, track pad, computer, tablet, smart phone, media device, printer, smart appliance, wearable, sensor, or the like. Indeed, in some embodiments, any/all of the accessory devices also may be capable of functioning as a host device in the ad hoc wireless connection 106. In practice, the ad hoc wireless connection 106 may be formed between the accessory device 102 and one or more of the host devices $104_{1-7}$. In some embodiments, formation of the ad hoc wireless connection 106 can occur (or be initiated) by the accessory device 102 transmitting a plurality of advertising beacons over a wireless medium. One or more of the advertising beacons may be received by one or more of the host devices 104. At least one of the advertising beacons may include, among possible other things, information identifying a time at which the accessory device 102 will initiate a page scan. The accessory device 102 can then initiate the page scan at the identified time and receive one or more pages, e.g., from one or more host devices 104. The connection between the host device 104 and the accessory device 102 can then be established using the received page.

For simplicity and explanation purposes, one ad hoc wireless connection—ad hoc wireless connection 106—is shown in FIG. 1. Based on the disclosure herein, a person of ordinary skill in art will understand that multiple ad hoc networks can exist in the environment shown in FIG. 1. For example, each of the host devices $104_1$-$104_7$ can form a separate ad hoc network with the accessory device 102. In another example, multiple host devices from the host devices $104_1$-$104_7$ can form an ad hoc network with the accessory device 102.

Figure 2:
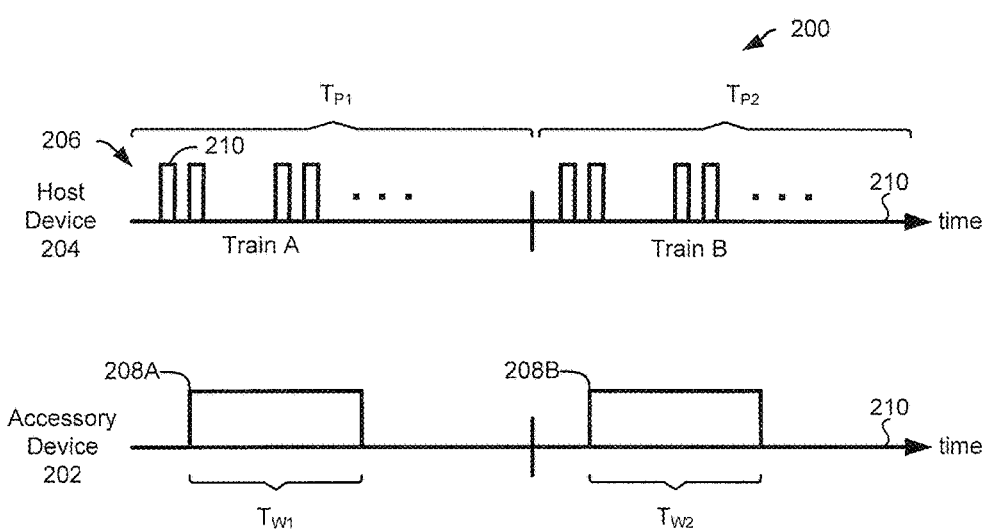
FIG. 2 is a diagram depicting an example communication between a host device and an accessory device according to some embodiments.

FIG. 2 is a diagram 200 depicting an example communication by a host device 204 (e.g., host device 104 from FIG. 1) to an accessory device 202 (e.g., accessory device 102 from FIG. 1) when the host and accessory devices attempt to establish a communication connection with one another, according to some embodiments. The example signals in diagram 200 are plotted against a time axis 210. As shown in FIG. 2, the host device 204 may transmit a series of signal trains 206, in which each signal train includes one or more pages 210. The example of FIG. 2 depicts the signal trains 206 as Train A and Train B, but more or fewer trains could be used in accordance with the scope and spirit of this disclosure. In some embodiments, the signal trains 206 may be implemented as Bluetooth pages. Each of the trains has a particular duration. For instance, as shown in the example of FIG. 2, Train A has a duration of $T_{P1}$ and Train B has a duration of $T_{P2}$. The respective durations of the trains, e.g., Train A and Train B, can be the same or can differ. Furthermore, in some embodiments, the trains, e.g., Train A and Train B, may be transmitted on the same channel or on different channels.

The accessory device 202 may periodically open a page scan window 208 such as, for example, page scan windows 208A and 208B shown in FIG. 2. The page scan window 208A may roughly correspond to Train A transmitted by the host device 104. Similarly, the page scan window 208B may roughly correspond to Train B transmitted by the host device 204. Each of the page scan windows 208A and 208B may also have a corresponding duration (or period). For instance, the page scan window 208A can have a duration $T_{W1}$ and the page scan window 208B can have a duration $T_{W2}$. It should be noted, that FIG. 2 is merely for illustrative purposes and no attempt has been made to depict the windows 208 of the accessory device 202 and the transmissions of the host device 204 to either a relative or absolute scale.

In some embodiments, the accessory device 202 detects, during the page scan window 208, one or more of the pages 210 associated with one of the trains 206 transmitted by the host device 204. Once the accessory device 202 detects a page 210 transmitted by the host device 204, the procedure for establishing a baseband connection can be followed, and the host device 204 and the accessory device 202 form a connection—e.g., ad hoc wireless connection 106 from FIG. 1.

Since page scanning can consume a significant amount of power, it can be advantageous to reduce the size of the page scan windows 208. For example, using shorter page scan windows 208 can reduce power consumption, thereby prolonging battery life. However, when the page scan window is too small, the page scan window 208 may not align with pages 210 transmitted by the host device 204. Consequently, several page scan windows 208 may be needed for the accessory device 202 to detect one or more pages 210 transmitted by the host device 204. This can delay establishment of the wireless connection (e.g., ad hoc wireless connection 106 from FIG. 1) between the host device 204 and the accessory device 202.

When the accessory device 202 can indicate to the host device 204 the time at which it intends to begin a page scan window 208, a connection can be established more quickly and battery/power consumption associated with scanning and paging can be reduced. This arrangement is described in more detail with respect to FIG. 3.

Figure 3:
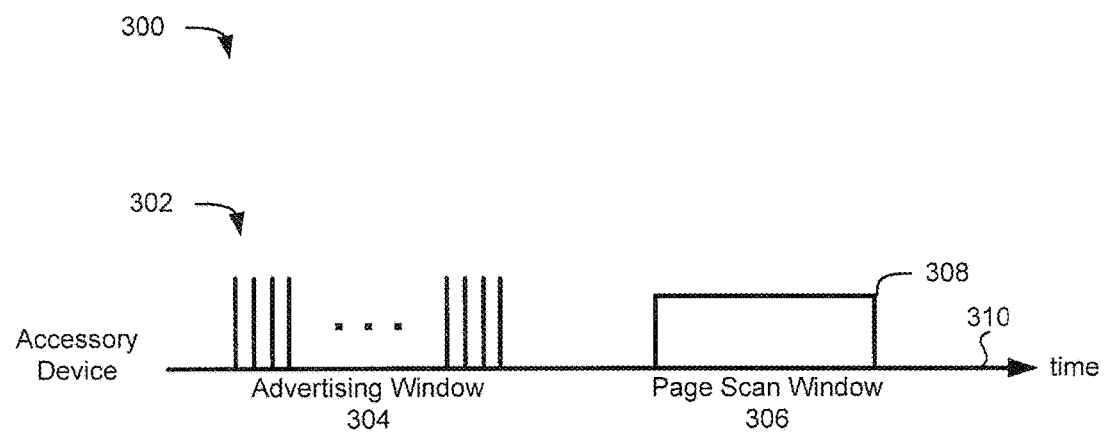
FIG. 3 is a diagram depicting example signals transmitted by an accessory device according to some embodiments.

FIG. 3 is a diagram 300 depicting example signals transmitted by a device, e.g., the accessory device 102 from FIG. 1, over time, according to some embodiments. The example signals in diagram 300 are plotted against a time axis 310. The diagram 300 shown in FIG. 3 is intended to depict signals functionally and no attempt has been made to show the signals to either an absolute or relative scale. As shown in FIG. 3, the accessory device transmits one or more beacons 302 (e.g., advertising beacons) during an advertising window 304 and then performs a page scan 308 (at a later time) during a page scan window 306.

To expedite connection establishment between the accessory device and a host device, e.g., a host device 104 from FIG. 1, the accessory device may transmit, as part of the beacons 302, information pertaining to the page scan 308 it intends to perform. For instance, one or more of the beacons 302 may contain timing information that informs a receiving host device of the time at which the accessory device will begin its page scan 308. In some embodiments, the timing information may take the form of a temporal offset from the time at which each individual beacon 302 is transmitted (sent). For instance, if the accessory device intends to begin its page scan 308 at t=10, then a beacon 302 sent at t=0 could indicate a temporal offset of 10 and a beacon 302 sent at t=1 could indicate a temporal offset of 9, and so on. Accordingly, the information contained in a beacon 302 may be generated dynamically and the content and/or format included in beacons 302 may differ from one another. Alternately or additionally, the information in some beacons 302 can indicate an absolute time at which the page scan 308 is to begin (e.g., at t=10 in the example). In some embodiments, the beacons 302 may be implemented as beacons that comply with the Bluetooth low energy standard or other radio protocols. Further, in some embodiments, the beacons 302 may be transmitted using two or more (different) protocols, using two or more different formats, and/or on two or more different channels.

When the host device receives one or more of the beacons 302 sent by the accessory device, the host device can schedule its paging to occur during a scheduled page scan 308 identified in the received beacon(s). In this way, the host device can increase the likelihood that the accessory device will receive one or more pages during the corresponding page scan 308. Further, the implementation can reduce the number of beacons 302 transmitted by the accessory device to establish an ad hoc network connection (e.g., ad hoc wireless connection 106 from FIG. 1) with the host device.

In some embodiments, in addition to information informing the host device about the time the page scan 308 will begin, the beacon 302 may include information identifying any/all of a duration of a page scan window 306, a value of a clock of the accessory device at the time when the beacon 302 was sent, a value of a clock of the accessory device at the beginning of the page scan window 306, and/or information identifying a channel to be used during the page scan window 306. Indeed, in some embodiments, some or all of this information may be provided instead of the information regarding when the page scan 308 will begin. According to some embodiments, a portion of the page scan window 306 may overlap with a portion of the advertising window 304, such that the page scan window 306 at least partially overlaps in time with one or more of the advertising beacons 302. Additionally, according to some embodiments, the advertising window 304 and the page scan window 306 may be uninterruptable, such that the respective window must be completed (elapse or fail) prior to any subsequent operation beginning.

Figure 4:
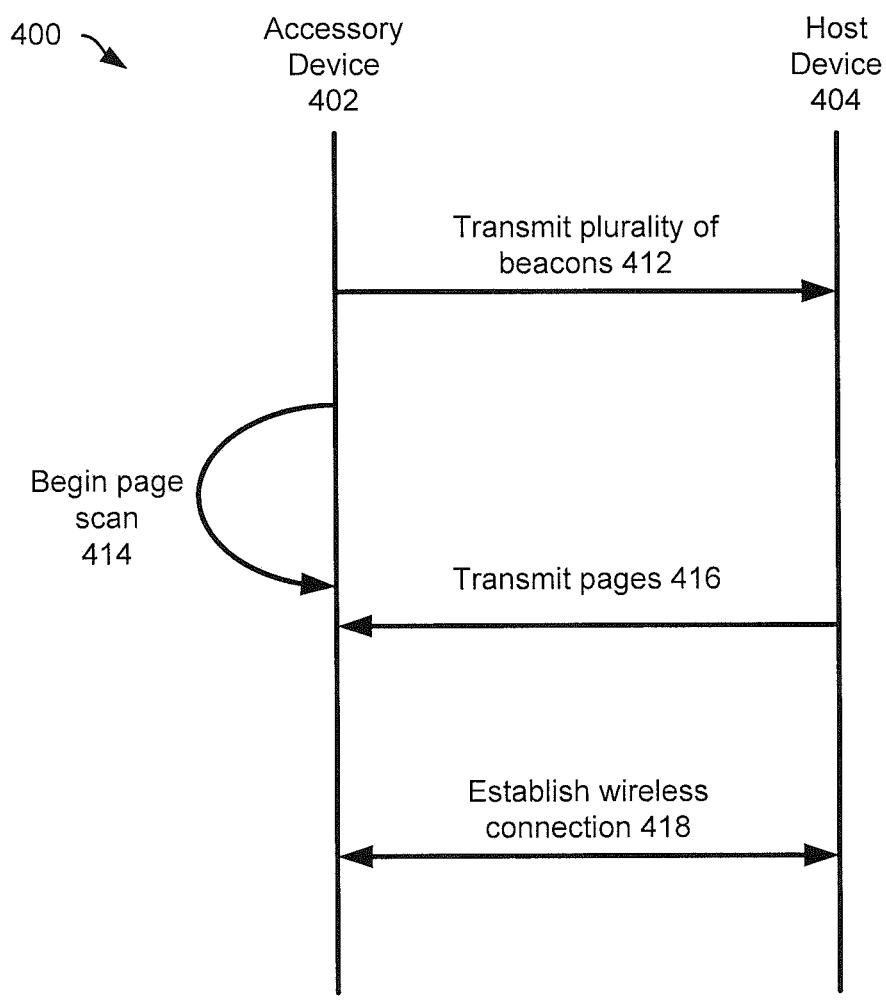
FIG. 4 is a diagram depicting example signals transmitted between an accessory device and a host device according to some embodiments.

FIG. 4 is a diagram 400 depicting example signals transmitted between an accessory device 402 (e.g., accessory device 102 from FIG. 1) and a host device 404 (e.g., host device 104 from FIG. 1) according to some embodiments. As shown in FIG. 4, the accessory device 402 may first transmit a plurality of beacons 412 (e.g., advertising beacons), one or more of which may be received by the host device 404. The beacons may include information pertaining to a page scan (e.g., page scan 308 from FIG. 3) that will be performed at some point in the future. For instance, the beacons may contain information identifying the time at which the accessory device 402 will begin the page scan. The time at which the page scan will begin may be represented using an absolute time reference or as a temporal offset from the scheduled time, according to some embodiments. In addition or alternately, the beacons may include information identifying a duration of the page scan window, a value of a clock for the accessory device at the beginning of the page scan window, and/or information identifying a channel that will be used during the page scan window. One or more other items of information can also be included in the beacons.

After transmitting the plurality of beacons (for instance, after the end of the advertising window 304 in FIG. 3), the accessory device 402 can begin its page scan 414 (opening the page scan window 306 in FIG. 3) at the predetermined time and/or channel. The host device 404 can then transmit one or more pages 416, which can be aligned in time with the page scan window of the accessory device 402. Upon receiving the one or more pages during the page scan window, a wireless connection 418 (e.g., ad hoc wireless connection 106 in FIG. 1) can then be established between the accessory device 402 and the host device 404.

Figure 5:
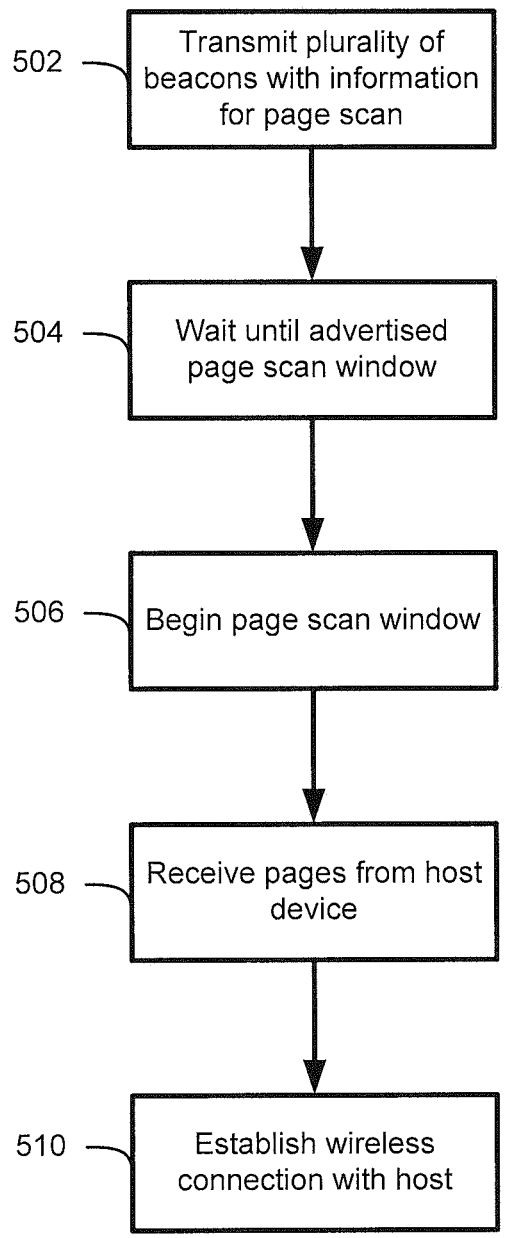
FIG. 5 is a flowchart depicting an example method of establishing a wireless connection between a host device and an accessory device according to some embodiments.

FIG. 5 is a flowchart depicting an example method 500 for establishing a wireless connection between a host device (e.g., host device 104 from FIG. 1) and an accessory device (e.g., accessory device 102 from FIG. 1). For convenience, FIG. 5 will be described with reference to FIGS. 1-4, but method 500 should not be understood to be limited to the specific embodiments depicted in those figures.

As shown in FIG. 5, method 500 begins at 502 by the accessory device transmitting a plurality of beacons (e.g., beacons 302 from FIG. 3) including information relating to a page scan that will occur at a future time. The beacons can include information pertaining to a page scan window (e.g., page scan window 306 from FIG. 3) that it will open at some point in the future. For instance, the beacons may contain information identifying the time at which the accessory device will begin the page scan, which may be represented as an absolute time reference or as a temporal offset from the time the page scan window will begin. Additionally or alternately, one or more beacons may include information identifying any/all of a duration of the page scan window, a value of a clock for the accessory device at the beginning of the page scan window, and/or information identifying a channel that will be used during the page scan window.

At 504, the accessory device may wait until the time representing the beginning of the page scan window, as advertised by the beacons. When such time occurs, at 506, the accessory device may begin the page scan. During the page scan, the accessory device can receive one or more pages from the host device at 508. In response to receiving one or more pages from the host device, a wireless connection can be established between the accessory device and the host device at 510.

Figure 6:
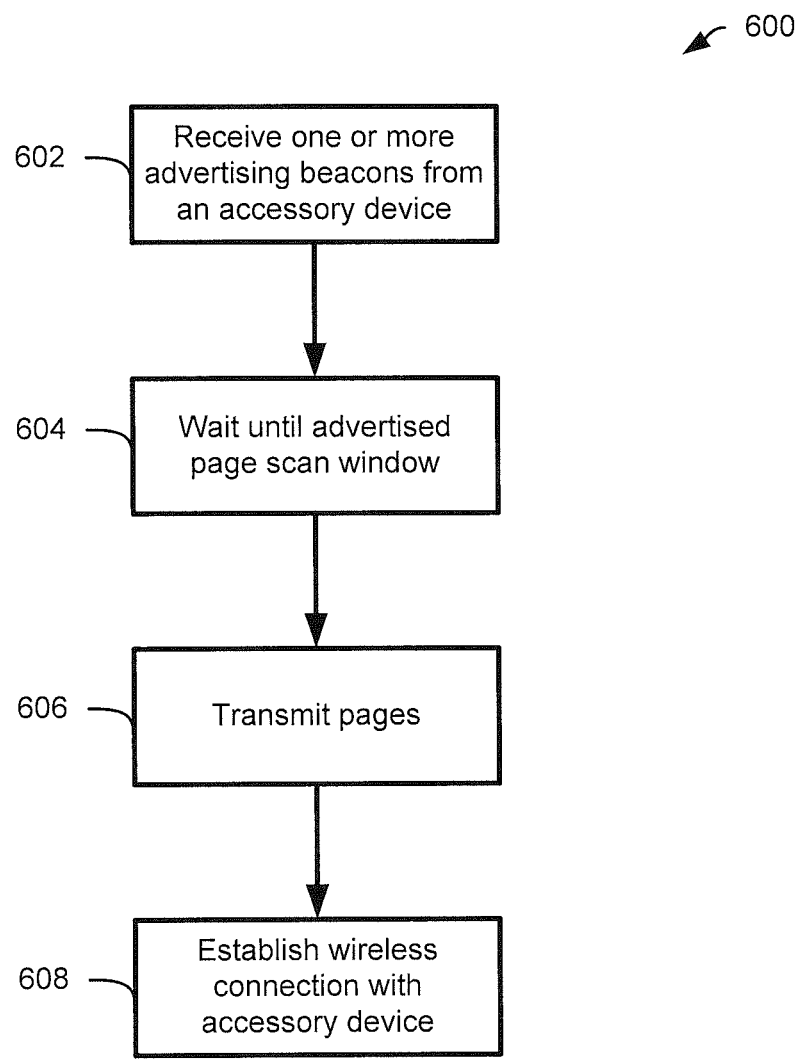
FIG. 6 is a flowchart depicting an example method of establishing a wireless connection between a host device and an accessory device according to some embodiments.

FIG. 6 is a flowchart depicting an example method 600 of establishing a connection (e.g., a baseband connection or ad hoc wireless connection 106) between a host device (e.g., host device 104 from FIG. 1) and an accessory device (e.g., accessory device 102 from FIG. 1). For convenience, FIG. 6 will be described with reference to FIGS. 1-4, but method 600 should not be understood to be limited to the specific embodiments depicted those figures.

Method 600 begins at 602 when the host device receives one or more beacons (e.g., beacons 302 from FIG. 3) transmitted by the accessory device. The beacons may contain information identifying a time when the accessory device will begin a page scan, which may be represented as an absolute time reference or as a temporal offset from the time the page scan window will begin, according to some embodiments. Additionally or alternately, one or more of the beacons may include information identifying any/all of a duration of the page scan window, a value of a clock for the accessory device at the beginning of the page scan window, and/or information identifying a channel that will be used during the page scan window. One or more other items of information can also be included in a beacon.

At 604, the host device waits until the time at which the page scan window advertised in the accessory device's beacon(s) is open. When the page scan window is open, the host device can transmit one or more pages at 606. After the one or more pages are received by the accessory device, a wireless connection between the host device and the accessory device can be established at 608.

Another way to potentially reduce latency when initiating a connection between a host device (e.g., host device 104 from FIG. 1) and an accessory device (e.g., accessory device 102 from FIG. 1) is for the host device to provide certain information to the accessory device prior to the initiation of the connection, according to some embodiments. Such an approach is shown in the example of FIG. 7.

Figure 7:
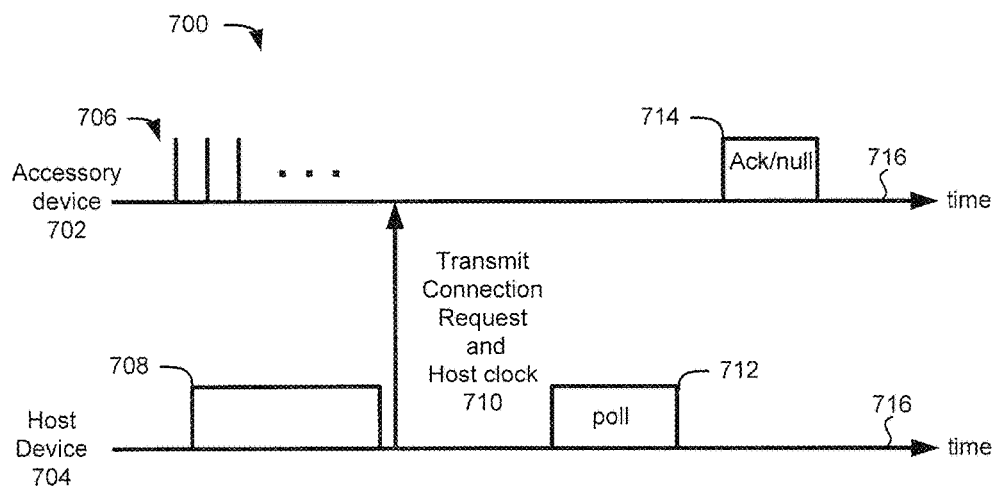
FIG. 7 is a diagram depicting example signals transmitted between an accessory device and a host device according to some embodiments.

FIG. 7 is a diagram 700 depicting example signals transmitted by an accessory device 702 (e.g. an accessory device 102 in FIG. 1) and a host device 704 (e.g., a host device 104 from FIG. 1), according to some embodiments. The example signals in diagram 700 are plotted against a time axis 716. In method 700, a page scan operation is not implemented, thus saving power and connection time according to some embodiments. As can be seen in FIG. 7, the accessory device 702 transmits a number of beacons 706. In some embodiments, the beacons 706 may be implemented as Bluetooth low energy beacons or beacons that comply with other radio protocols. In other embodiments, the beacons 706 may also or alternately be implemented as the modified beacons described above (e.g., beacons 302 from FIG. 3). In some embodiments, the beacons 706 may be transmitted using two or more (different) protocols, using two or more different formats, and/or on two or more different channels. Further, in some embodiments, the content and/or format of the beacons 706 can vary, such that the beacons 706 need not be identical to one another.

Figure 8:
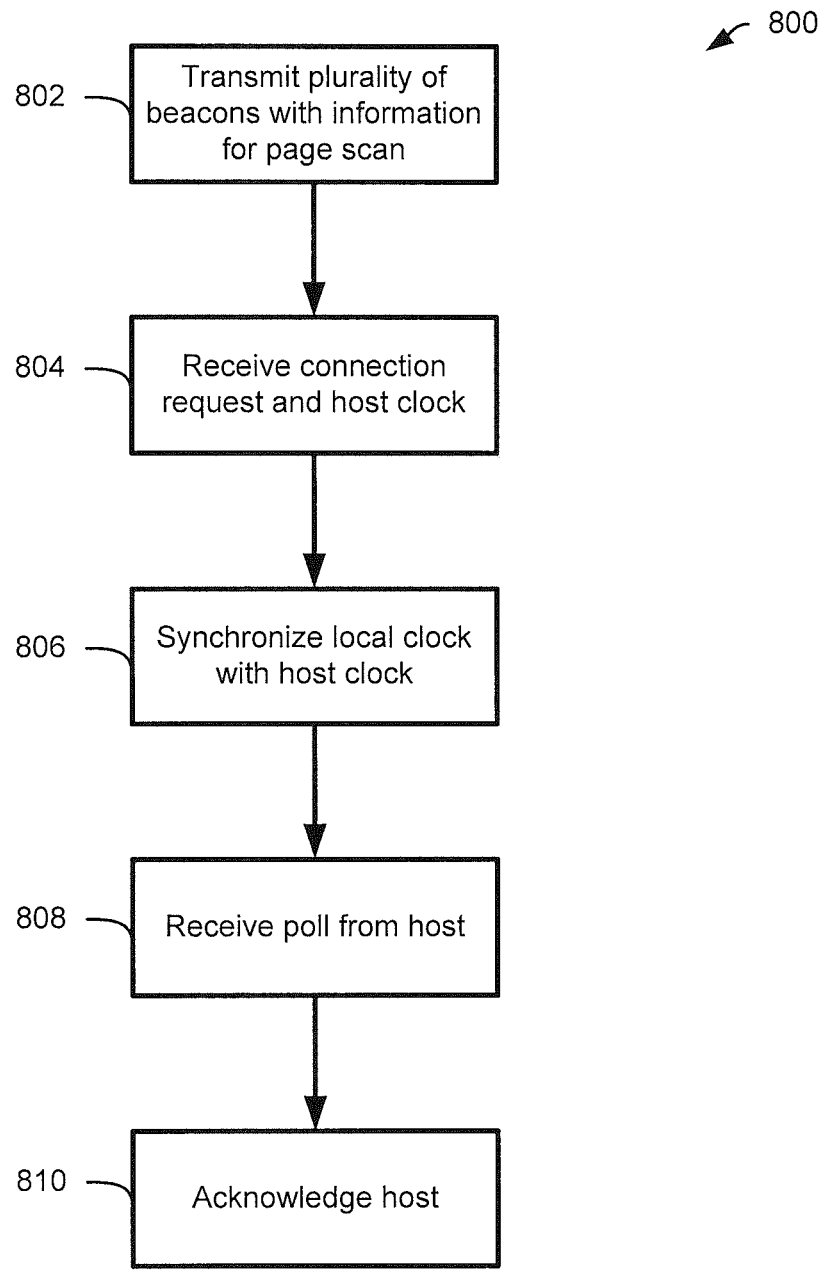
FIG. 8 is a flowchart depicting an example method of establishing a wireless connection between a host device and an accessory device according to some embodiments.

The host device 704 can detect one or more of the beacons 706 during a beacon scan window 708. When the host device 704 detects one or more of the beacons 706, it can determine that the accessory device 702 is in close physical proximity to the host device 704—e.g., within an effective communication range or other range threshold. In addition or alternately, the host device 704 may determine that the accessory device 702 is in close physical proximity to the host device 704 after analyzing a characteristic of one or more of the beacons 706 such as, for example, one or more of signal strength, a signal-to-noise ratio, a bit error rate, accessory device state information, transmit power, etc., or any combination thereof. In such a case, the host device 704 may conclude that it is in close physical proximity to the accessory device if one or more characteristics of the beacons 706 compare in a predetermined manner (e.g., above and/or below) with a corresponding threshold for that characteristic. In some embodiments, if the host device 704 would like to connect to the accessory device 702, it can transmit a connection request 710 that includes a value of the host device clock. The accessory device 702 can synchronize its local clock with the host device clock to assist with establishing a wireless connection between the accessory device 702 and the host device 704. In some embodiments, the host device 704 may poll 712 the accessory device 702, which can acknowledge 714 with a message such as a null message. This shall be described further with reference to FIG. 8, which is a flowchart depicting an example method 800 of establishing a wireless connection between a host device (e.g., host device 104 from FIG. 1) and an accessory device (e.g., accessory device 102 from FIG. 1), according to some embodiments. For convenience, FIG. 8 will be described with reference to FIGS. 1-7, but method 800 should not be understood to be limited to the specific embodiments depicted in those figures.

Method 800 begins at 802 with transmission of a plurality of beacons (e.g., beacons 706 from FIG. 7) by an accessory device. In some embodiments, the beacons may include Bluetooth low energy beacons or beacons that comply with other radio protocols. The beacons may also or alternately be implemented as the modified beacons described above (e.g., beacons 302 from FIG. 3). In response to the beacons, at 804, the accessory device may receive a connection request (e.g., connection request 710 from FIG. 7) from a host device. The connection request may also include a value of a host device clock, e.g., for synchronization purposes. At 806, the accessory device may synchronize its local clock with the host device clock received in the connection request. A connection can then be established between the host device and the accessory device. At 808, a poll (e.g., poll 712 from FIG. 7) can be received from the host device and at 810, the accessory device can acknowledge the poll (e.g., acknowledgement 714 from FIG. 7).

Figure 9:
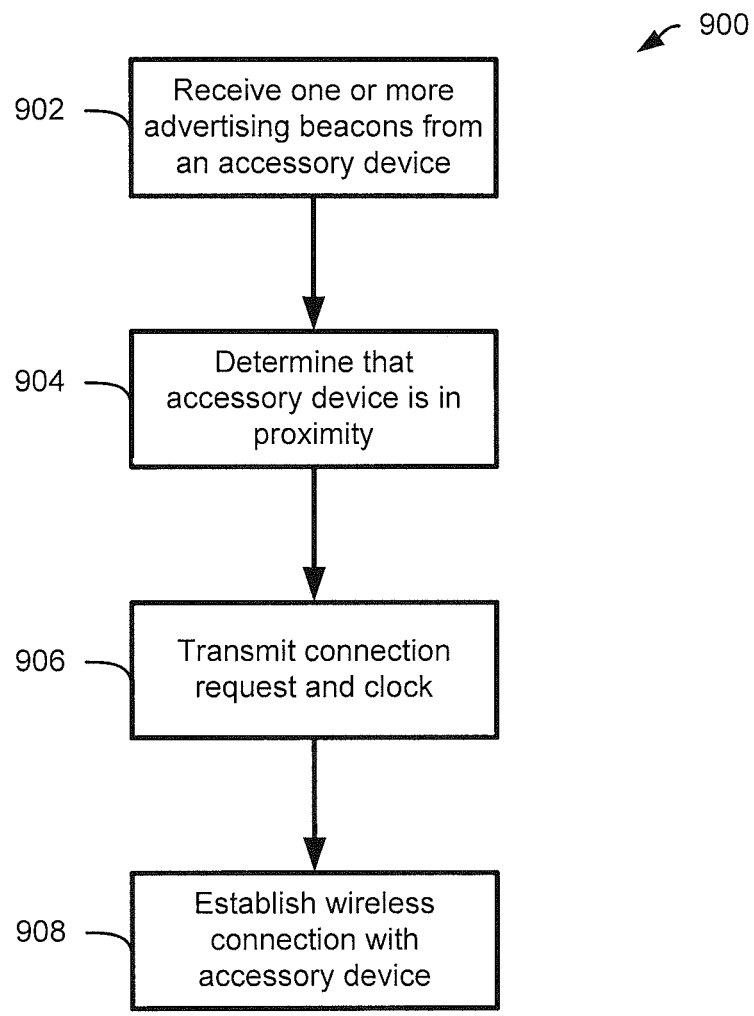
FIG. 9 is a flowchart depicting an example method of establishing a wireless connection between a host device and an accessory device according to some embodiments.

FIG. 9 is a flowchart depicting an example method 900 of establishing a wireless connection between a host device, e.g., a host device 104, and an accessory device, e.g., an accessory device 102, according to some embodiments. For convenience, FIG. 9 will be described with reference to FIGS. 1-7, but method 900 should not be understood to be limited to the specific embodiments depicted those figures.

As shown in FIG. 9, method 900 begins at 902 when a host device receives one or more advertising beacons (e.g., beacons 706 from FIG. 7) from an accessory device. In some embodiments, the beacons may be implemented as Bluetooth low energy beacons or beacons that comply with other radio protocols. The beacons alternatively may be implemented as the modified beacons described above (e.g., beacons 302 from FIG. 3). The received beacons allow the host device to determine that the accessory device is in close physical proximity to the host device at 904. In response to determining that the devices are in close proximity, the host device transmits a connection request (e.g., connection request 710 from FIG. 7) to the accessory device at 906. According to some embodiments, the connection request may include information relating to a value of the host device clock. At 908, a wireless connection (e.g., a baseband connection or ad hoc wireless connection 106) can be established between the host device and the accessory device.

Figure 10:
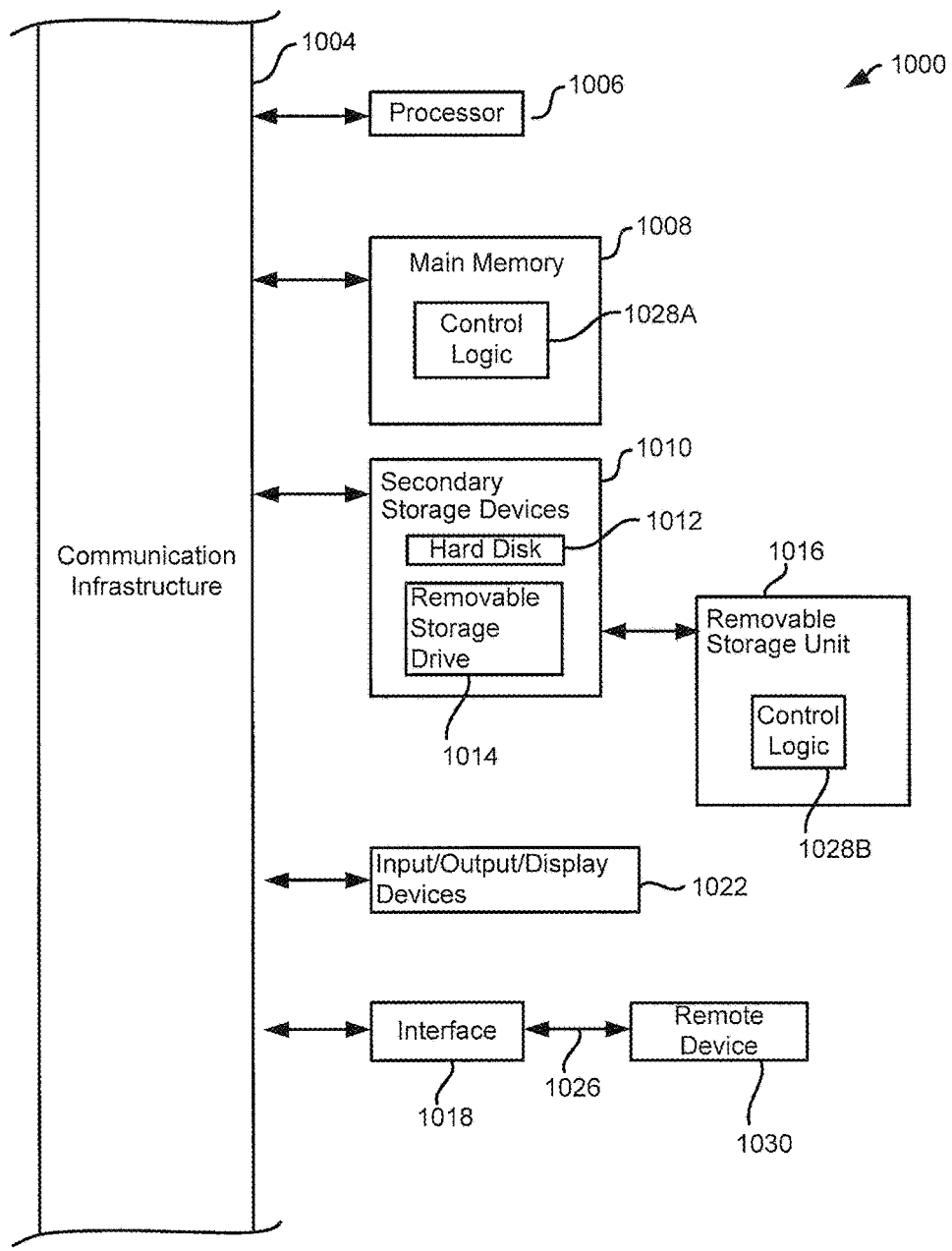
FIG. 10 is a functional block diagram depicting an example computer system that can be used to implement various aspects of embodiments of this disclosure.

Various embodiments can be implemented, for example, using one or more well-known computer systems, such as computer system 1000 shown in FIG. 10. For instance, each of the components and/or operations described with reference to FIGS. 1-9 could be implemented using one or more computer systems 1000 or portions thereof. The computer system 1000 can be any computer capable of performing the functions described herein.

The computer system 1000 includes one or more processors (also called central processing units, or CPUs), such as a processor 1004. The processor 1006 is connected to a communication infrastructure or bus 1006.

The processor 1006 may be, for example, a graphics processing unit (GPU). In some embodiments, the GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 1000 also includes user input/output/display device(s) 1022, such as monitors, keyboards, pointing devices, etc., that communicate with communication infrastructure 1004.

The computer system 1000 also includes a main or primary memory 1008, such as random access memory (RAM). The main memory 1008 may include one or more levels of cache. The main memory 1008 has stored therein control logic 1028A (e.g., computer software) and/or data.

The computer system 1000 may also include one or more secondary storage devices or memory 1010. The secondary memory 1010 may include, for example, a hard disk drive 1012 and/or a removable storage device or drive 1014. The removable storage drive 1014 may be a floppy disk drive, a magnetic tape drive, a compact disk drive, an optical storage device, tape backup device, and/or any other storage device/drive.

The removable storage drive 1014 may interact with a removable storage unit 1016. The removable storage unit 1018 includes a computer usable or readable storage device having stored therein control logic 1028B (e.g., computer software) and/or data. The removable storage unit 1018 may be a floppy disk, magnetic tape, compact disk, DVD, optical storage disk, and/any other computer data storage device. The removable storage drive 1014 reads from and/or writes to the removable storage unit 1016.

The computer system 1000 may further include a communication or network interface 1018. The communication interface 1018 enables the computer system 1000 to communicate and interact with any combination of remote devices, remote networks, remote entities, etc. (individually and collectively referenced by reference number 1030). For example, communication interface 1018 may allow the computer system 1000 to communicate with remote devices 1030 over a communications path 1026, which may be wired and/or wireless, and which may include any combination of LANs, WANs, the Internet, etc. Control logic and/or data may be transmitted to and from computer system 1000 via communication path 1026.

In some embodiments, a tangible apparatus or article of manufacture including a tangible computer useable or readable medium having control logic (software) stored thereon is also referred to herein as a "computer program product" or "program storage device." This includes, but is not limited to, the computer system 1000, the main memory 1008, the secondary memory 1010, and the removable storage unit 1016, as well as tangible articles of manufacture embodying any combination of the foregoing. Such control logic, when executed by one or more data processing devices (such as the computer system 1000), causes such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure so that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of any parent application or other related applications. The Applicant therefore rescinds any disclaimer of claim scope made in the parent application or any predecessor or related application in relation to the instant application. The Examiner is therefore advised that any such previous disclaimer and the cited references that it was made to avoid, may need to be revisited. Further, the Examiner is also reminded that any disclaimer made in the instant application should not be read into or against the parent or related application(s).

What is claimed is:

1. A method of wirelessly connecting an accessory device to a host device, the method comprising:
   transmitting, by the accessory device, a plurality of advertising beacons over a wireless medium to the host device, wherein at least one of the plurality of advertising beacons comprises information identifying a time at which the accessory device will initiate a page scan to receive one or more pages from the host device;

initiating, by the accessory device, the page scan at the identified time, wherein the identified time is after the plurality of advertising beacons are transmitted;

receiving, by the accessory device, the one or more pages from the host device during the page scan; and establishing a wireless connection with the host device in response to the received one or more pages.

2. The method of claim 1, wherein the at least one of the plurality of advertising beacons includes information identifying a duration of the page scan.

3. The method of claim 1, wherein the at least one of the plurality of advertising beacons includes information identifying a value of a clock of the accessory device at a beginning of the page scan.

4. The method of claim 1, wherein the at least one of the plurality of advertising beacons includes information identifying a channel to be used during the page scan.

5. The method of claim 1, wherein the information identifying the time at which the accessory device will initiate the page scan comprises a temporal offset between a time when a last one of the plurality of advertising beacons is transmitted and a time the page scan is initiated.

6. The method of claim 1, wherein transmitting the plurality of advertising beacons further comprises transmitting the plurality of advertising beacons during an advertising window prior to the page scan.

7. The method of claim 1, wherein each of the plurality of advertising beacons comprises a Bluetooth low energy beacon.

8. The method of claim 1, wherein transmitting the plurality of advertising beacons comprises transmitting the plurality of advertising beacons at regular intervals.

9. The method of claim 1, further comprising:
dynamically updating the information included in the at least one of the plurality of advertising beacons of the plurality of advertising beacons.

10. The method of claim 1, wherein initiating the page scan comprises partially overlapping in time the page scan with the transmission of one or more of the plurality of advertising beacons.

11. A method of wirelessly establishing a connection between a host device and an accessory device, the method comprising:
receiving, at the host device, an advertising beacon from the accessory device, wherein the advertising beacon comprises information identifying a time when the accessory device will begin a page scan to receive one or more pages from the host device;
generating, at the host device and in response to the advertising beacon, a page;
transmitting, by the host device, the page after the identified time when the accessory device will begin the page scan, wherein the identified time is after a time the advertising beacon was received at the host device; and
establishing a connection with the accessory device through a wireless medium.

12. The method of claim 11, further comprising:
determining, based at least in part on the received advertising beacon, that the accessory device is within proximity of the host device.

13. The method of claim 11, wherein the information identifying the time when the accessory device will begin the page scan comprises a temporal offset until the page scan will begin.

14. The method of claim 11, wherein the advertising beacon includes information identifying a duration of a page scan window corresponding to the page scan.

15. The method of claim 11, wherein the advertising beacon includes information identifying a value of a clock of the accessory device at a beginning of a page scan window corresponding to the page scan.

16. The method of claim 11, wherein the advertising beacon includes information identifying a channel the accessory device will use during the page scan.

17. The method of claim 11, wherein the advertising beacon comprises a Bluetooth low energy beacon.

18. The method of claim 11, further comprising:
receiving a second beacon comprising information identifying the time when the accessory device will begin the page scan.

19. A method of initiating a connection between a host device and an accessory device, the method comprising:
receiving, at the host device, one or more advertising beacons transmitted by the accessory device, wherein the one or more advertising beacons comprises information identifying a time at which the accessory device will begin a page scan to receive one or more pages from the host device;
determining, at the host device, and based at least in part on the advertising one or more beacons transmitted by the accessory device, that the accessory device is proximate to the host device;
transmitting, by the host device, a connection request to the accessory device, the connection request comprising information identifying a value of a clock of the host device;
after transmitting the connection request, receiving an acknowledgement from the accessory device; and
connecting with the accessory device to form an ad hoc wireless network.

20. The method of claim 19, wherein the one or more advertising beacons further comprises information on a duration of the page scan, information on a channel to be used during the page scan, or a combination thereof.

* * * * *